United States Patent
Panin

(10) Patent No.: US 12,453,714 B2
(45) Date of Patent: Oct. 28, 2025

(54) COMPOSITION COMPRISING AN ESTER OF ALPHA-TOCOPHEROL FOR REDUCING THE RISK OF PRETERM BIRTH

(71) Applicant: HULKA S.R.L., Rovigo (IT)

(72) Inventor: Giorgio Panin, Rovigo (IT)

(73) Assignee: HULKA S.R.L., Rovigo (IT)

( * ) Notice: Subject to any disclaimer, the term of this patent is extended or adjusted under 35 U.S.C. 154(b) by 0 days.

(21) Appl. No.: 18/562,492

(22) PCT Filed: May 16, 2022

(86) PCT No.: PCT/EP2022/063177
§ 371 (c)(1),
(2) Date: Nov. 20, 2023

(87) PCT Pub. No.: WO2022/248269
PCT Pub. Date: Dec. 1, 2022

(65) Prior Publication Data
US 2024/0261255 A1    Aug. 8, 2024

(30) Foreign Application Priority Data
May 27, 2021 (IT) .......... 102021000013898

(51) Int. Cl.
| | | |
|---|---|---|
| *A61K 31/355* | (2006.01) | |
| *A61K 9/00* | (2006.01) | |
| *A61K 47/12* | (2006.01) | |
| *A61K 47/44* | (2017.01) | |
| *A61P 15/06* | (2006.01) | |

(52) U.S. Cl.
CPC ............ *A61K 31/355* (2013.01); *A61K 9/006* (2013.01); *A61K 47/12* (2013.01); *A61K 47/44* (2013.01); *A61P 15/06* (2018.01)

(58) Field of Classification Search
CPC ...... A61K 31/355; A61K 9/006; A61K 47/12; A61K 47/44; A61P 15/06
See application file for complete search history.

(56) References Cited

U.S. PATENT DOCUMENTS

2017/0035781 A1* 2/2017 Giliyar .................. A61K 31/57
2017/0290799 A1* 10/2017 Panin .................... A61K 9/0043

FOREIGN PATENT DOCUMENTS

| CN | 101999426 B | 11/2011 |
|---|---|---|
| EP | 3375432 A1 | 9/2018 |

OTHER PUBLICATIONS

Bartfail et al., "Birth outcomes of pre-eclamptic pregnant women with vitamin E supplementation—A population-based study", The Open Drug Safety Journal, vol. 2, Oct. 5, 2011, pp. 54-60.
Hauth J. C. et al., "Vitamin C and E supplementation to prevent spontaneous preterm birth: a randomized controlled trial", Obstetrics and Gynecology vol. 116, No. 1, Sep. 1, 2010, pp. 653-658.
Search Report and Written Opinion of PCT/EP2022/063177 issued Aug. 30, 2022.
Thoene M et al., "Fat-soluble nutrients and omega-3 fatty acids as modifiable factors influencing preterm birth risk", Placenta, vol. 98, Dec. 5, 2019 pp. 38-42.

* cited by examiner

*Primary Examiner* — Jessica Worsham
(74) *Attorney, Agent, or Firm* — Silvia Salvadori, P.C.; Silvia Salvadori

(57) ABSTRACT

A composition for topical application to the oral cavity, for the use in pregnant women to reduce the risk of preterm birth, comprising an ester of vitamin E with a carboxylic acid of formula R—COOH, in which R is an alkyl radical having 1 to 19 carbon atoms, or an alkenyl or alkynyl radical having 2 to 19 carbon atoms, and an oily vehicle; the ester of vitamin E can be selected from vitamin E acetate, n-propionate or linoleate, preferably alpha-tocopheryl acetate.

7 Claims, No Drawings

COMPOSITION COMPRISING AN ESTER OF ALPHA-TOCOPHEROL FOR REDUCING THE RISK OF PRETERM BIRTH

This application is a U.S. national stage of PCT/EP2022/063177 filed on 16 May 2002, which claims priority to and the benefit of Italian Patent Application No. 102021000013898 filed on 27 May 2021, the contents of which are all incorporated herein by reference in their entireties.

FIELD OF APPLICATION

The present invention refers to the field of pharmaceutical and cosmetic industry. In particular, the invention relates to a composition for the use in the reduction of the risk of preterm birth.

PRIOR ART

It is known that preterm birth, defined as birth before 37 weeks of gestation, is one of the main causes of prenatal morbidity and mortality (1), (29). Common preterm-birth causes include, for example, multiple pregnancies, infections, and chronic conditions such as diabetes or hypertension.

Different strategies have been employed to prevent preterm birth, including progesterone administration, application of cervical cerclage, cervical pessary, as well as lifestyle modifications (2-24).

According to Romero et. al., preterm labor is similar to a syndrome with many causes associated to intra-amniotic inflammation, decidual senescence and interruption of maternal-fetal tolerance (i.e., the tolerance of the maternal immune system toward the fetus) (25); more than 30% of all preterm labors is related to intra-amniotic infections (25).

Microorganisms can enter the amniotic cavity through several routes, including vagina and cervix, the peritoneal cavity, invasive procedures, as well as hematogenous dissemination through the placenta (26). Therefore, any focus of infection may hypothetically result in preterm labor and preterm birth.

Recently, several studies reported a significant association between oral hygiene and preterm birth using image analysis tools for quantifying dental plaque biofilm (27).

In particular, many studies focused on the role of periodontal disease as a risk factor for preterm birth (28, 30-32), pointing out that periodontal diseases raise the circulating levels of IL-1β, IL-6, IL-8, IL-17 and TNF-α, which are interleukins associated to systemic inflammation and preterm birth.

It is known that periodontal disease is a form of inflammation which occurs in the tissues of the oral cavity, caused by a bacterial film which forms around teeth and gums, leading as a result to bone destruction. Periodontal disease is caused by inadequate oral hygiene and involves dental plaque accumulation and swollen red gums which can bleed upon teeth brushing.

It is also known that pregnant women suffering from gum diseases have a higher probability of preterm birth, with potential serious complications which may cause health problems for their infant, including a low birth weight. Prematurely born infants can also risk several health conditions, including cerebral palsy and hearing and seeing problems.

For preventing and treating periodontal disease, in addition to a periodic tartar removal, topical treatments with disinfectants, such as chlorhexidine, and also systemic treatments with antibiotics, such as amoxicillin and metronidazole, are used.

However, said disinfectants and antibiotics should be used very cautiously if the patient is pregnant. In this case, treatments less susceptible to causing problems to the patient and the unborn baby should be used.

Patent application EP1072254 describes a composition to prevent or treat periodontal disease comprising natural polyphenols in association with vitamin C its salts and/or vitamin E and/or vitamin A and/or beta-carotene.

International patent application WO2019/106060 describes a composition to be orally administered, which is specifically formulated for pregnant women who have already had a preterm birth, or who are at risk of preterm birth; such a composition comprises different ingredients, including tocopherol, zinc, retinol, or a combination thereof.

Patent application EP2805724 describes a pharmaceutical composition comprising a hydrate form of magnesium oxide, an additional active agent, for example Vitamin E, and a pharmaceutically acceptable vehicle, suitable for oral use in treating various pathologies, including premature labor.

International patent application WO2011/150393 describes a method for reducing the risk of complications associated to pregnancy (including premature birth), in a pregnant woman, which involves oral administration of lactoferrin, in association with a prenatal nutritional mixture which may comprise different vitamins including riboflavin, folic acid and also Vitamin E.

The technical problem underlying the present invention is that of providing a safe and effective composition to be used for oral hygiene by pregnant women to prevent or reduce the risk of a premature birth.

SUMMARY OF THE INVENTION

The present invention solves the above-mentioned technical problem by providing a composition for topical application to the oral cavity, for the use in pregnant women to reduce the risk of premature birth, wherein the composition comprises an ester of vitamin E with a carboxylic acid of formula R—COOH, in which R is an alkyl radical having 1 to 19 carbon atoms, or an alkenyl or alkynyl radical having 2 to 19 carbon atoms, and an oily vehicle.

Preferably, said composition does not comprise any other ingredient besides said ester of vitamin E and said oily vehicle.

By vitamin E, d-α-tocopherol, a mixture of the two d- and l-enantiomers of α-tocopherol, a mixture of other tocopherols (β, γ, δ, ε, ζ, η) or tocotrienols are meant.

Preferably, said ester is vitamin E acetate, n-propionate or linoleate.

The use of vitamin E acetate is particularly preferred, in particular alpha-tocopheryl acetate.

Preferably, the composition comprises 3% to 40%, advantageously 10% to 30%, by weight of said ester of vitamin E of the total weight of the composition.

Preferably, the oily vehicle is selected from the group comprising (INCI name indicated in brackets) hydrogenated polyisobutene (Hydrogenated Polyisobutene), hydrogenated polydecene (Hydrogenated Polydecene), mixtures of hydrogenated polyisobutene and/or hydrogenated polydecene with hydrogenated polyolefins, in particular hydrogenated $C_6$-$C_{14}$ polyolefins (Hydrogenated $C_{6-14}$ Polyolefin), caprylic/capric glyceride (Caprilic/Capric Triglyceride), olus oil (Olus Oil), baobab oil (Adansonia Digitata Oil), baobab seed oil (Adansonia Digitata Seed Oil), coco-caprylate/caprate (Coco-Caprylate/Caprate), olive squalane (Olive Squalane), olive squalene (Olive Squalene), sunflower oil (Sunflower (*Helianthus Annus*) Seed Oil), coco caprylate (Coco-Caprylate), isononyl isononanoate (Isononyl Isononanoate), cyclopentasiloxane (Cyclopentasiloxane), olive oil (Olea Europea Fruit Oil, Olea Europea Leaf Oil), soybean oil (Glycine Soja Oil), corn oil (Zea Mays Oil, Zea Mays Germ Oil), ozonized olive oil (Ozonized Olive Oil), macadamia integrifolia oil (Macadamia Integrifolia Seed Oil), macadamia ternifolia oil (Macadamia Ternifolia Seed Oil), almond oil (Almond Oil), argan oil (Argan Oil), oat kernel oil (Avena Sativa Kernel Oil), starflower oil (Borrago Officinale seed oil), moringa oleiferea seed oil (Moringa Oleiferea Seed Oil), rice bran oil (Oryza Sativa Germ Oil, Oryza Sativa Seed Oil), liquid paraffin (Paraffinum Liquidum), avocado oil (Persea Gratissima Oil), jojoba seed oil (Simmondsia Chinensis Seed Oil), vegetable oil (Vegetable Oil), grape seed oil (Vitis Vinifera Seed Oil) and mixtures thereof.

A particularly preferred vehicle consists of caprylic/capric glyceride.

A particularly preferred composition consists of alpha-tocopheryl acetate and caprylic/capric glyceride.

Advantageously, said composition consists of 10-30% of alpha-tocopheryl acetate and 70-90% of caprylic/capric glyceride.

The above-described composition for topical application to the oral cavity in pregnant women, when used as described above, also allows to reduce the risk of low birth weight of an infant.

The invention also refers to an ester of vitamin E with a carboxylic acid of formula R—COOH, in which R is an alkyl radical having 1 to 19 carbon atoms, or an alkenyl or alkynyl radical having 2 to 19 carbon atoms for the use in a pregnant woman by topical application to the oral cavity, to reduce the risk of premature birth and low birth weight of an infant.

Preferably, the ester of vitamin E for the use at issue is vitamin E acetate, conveniently alpha-tocopheryl acetate.

All the percentages given in the present application are to be understood, unless otherwise stated, as percentages by weight of the total weight of the composition.

DETAILED DESCRIPTION

The Applicant has been producing for a number of years a preparation based on alpha-tocopheryl acetate, marketed under the name of VEA® Oris (20% alpha-tocopheryl acetate and 80% caprylic/capric glyceride), for application to the mucosa of the oro-pharyngeal cavity, having an emollient and protective effect.

Considering the above-mentioned emollient and protective properties as well as the total safety and harmlessness of alpha-tocopheryl acetate, as well as the ease of application of said preparation in spray form, the Applicant thought to verify the efficacy of said product in the oral hygiene of pregnant women at risk of premature birth.

The expressions "preterm birth" and "premature birth" are equivalent and are herein used interchangeably.

Indeed, it was very surprisingly found out that the product VEA® Oris, used as a spray for oral hygiene, is able to significantly reduce the risk of preterm birth and of related complications associated to said risk, including prenatal death and low birth weight of infants, preeclampsia, as it will clearly appear from the experimental results of the clinical test below.

The expression "preterm birth", as herein used, indicates a birth occurred before the 37th pregnancy week.

The term "preeclampsia", as herein used, indicates an increase of blood pressure after 20 pregnancy weeks, possibly associated to proteinuria or to an abnormal reduction of platelet amount and/or an abnormal increase of creatinine amount, and to doubling of the values of concentration of aspartate aminotransferase (AST) or alanine aminotransferase (ALT).

The expression "prenatal death", as herein used, indicates intrauterine fetal death or neonatal death.

Different compositions according to the present invention were prepared, such as those indicated in the following examples 1-4, by dissolving the indicated ester of vitamin E in the respective oily vehicle. Said compositions were used to prepare corresponding 20 ml small bottles for spray delivery without gas.

Example 1

VEA® Oris

| | |
|---|---|
| Alpha-tocopheryl acetate | 20% |
| Caprylic/capric glyceride | 80% |

Example 2

| | |
|---|---|
| Alpha-tocopheryl linoleate | 20% |
| Caprylic/capric glyceride | 80% |

Example 3

| | |
|---|---|
| Alpha-tocopheryl acetate | 10% |
| Hydrogenated polyisobutene | 90% |

Example 4

| | |
|---|---|
| Alpha-tocopheryl acetate | 25% |
| Olus Oil | 75% |

Example 5

Clinical Test

Methods, Treated Subjects and Control Subjects

A retrospective cohort study was carried out using data of pregnant women at risk of preterm birth that, in particular, had previously had a preterm birth or had previously undergone a cervical surgery.

Said study included women meeting the following inclusion criteria: single gestations and at least one risk factor of preterm birth, including having had a preceding preterm birth, a specific cervical length estimated by transvaginal ultrasonography at mid-trimester ("transvaginal ultrasound cervical length", TVU CL), obesity or having been subjected to preceding cervical surgery.

Women meeting the following exclusion criteria were excluded from the cohort study: multiple gestations, placenta praevia/accreta, women with diagnosis of fetal abnormalities.

Women meeting the aforementioned inclusion criteria were divided into two 100-subject groups, i.e., a group treated with the product VEA® Oris (according to Example 1, in the form of an oral spray) and a control group, not treated with said product.

The treated women group and the control women group were similar in terms of maternal demographic data, as shown in Table 1 below.

TABLE 1

Maternal demographic data of the treated group (VEA ® Oris oral spray) and of the control group

|  | VEA ® Oris oral spray No. subjects = 100 | Control No. subjects = 100 |
|---|---|---|
| Age | 28.5 ± 6.1 | 29.9 ± 6.4 |
| Preceding preterm birth | 59 (59%) | 51 (51%) |
| Preceding cervical surgery | 7 (7%) | 11 (11%) |
| TVU CL ≤25 mm | 44 (44%) | 53 (53%) |
| BMI (body mass index) >30 | 17 (17%) | 21 (21%) |

Data are shown as numbers (percentages) or as average ± standard deviation (SD).

Treatment

In the present clinical study, data about oral hygiene and the use of fluoride toothpaste, mouthwash and dental floss of the group treated with VEA® Oris and of the control group were analyzed retrospectively.

In particular, the product VEA® Oris was administered in the form of a spray, to be topically applied daily in the oral cavity during pregnancy.

Overall, 25/200 women reported to have had at least one professional teeth cleaning during pregnancy. The reported use of fluoride toothpaste, mouthwash and dental floss was of 35%, 22% and 13%, respectively.

Most of the women in the treated group used the product VEA® Oris, in the form of a spray, twice a day (67/100), whereas the rest (33/100) used it once a day.

In the group treated with VEA® Oris, 65 women started treatment with the product VEA® Oris in the first trimester of pregnancy, 30 women in the second trimester of pregnancy, and 5 women in the third trimester of pregnancy, and continued the treatment until the end of gestation.

In particular, of the 65 women who started therapy in the first trimester, 49 women used the VEA® Oris oral spray for the whole pregnancy, 9 women used the VEA® Oris oral spray only in the first and in the second trimesters, and 7 women used the VEA® Oris oral spray only in the third trimester of pregnancy.

The statistical analysis was carried out using the software "Statistical Package for Social Sciences (SPSS)" v. 19.0 (IBM Inc., Armonk, NY, USA). The data were shown as average ± standard deviation (SD) or as a number (percentage). The variables for each category were compared using the chi-square test or the Fisher's exact test. The comparison within the group was carried out using the Wilcoxon-Mann-Whitney test. The P value <0.05 was considered statistically significant.

At the end of the treatment, the following parameters were evaluated, both in the control group and in the group treated with VEA® Oris:
  preterm birth: birth occurred before the 37th pregnancy week;
  preeclampsia: blood pressure ≥140/90, measured at two time points four hours apart or blood pressure ≥160/110 measured once, after 20 weeks of gestation, associated to a doubling of the values of concentration of aspartate aminotransferase (AST) or alanine aminotransferase (ALT) and to: proteinuria (amount of proteins in the urine ≥300 mg in 24 hours or protein/creatinine ratio >0.3), or a platelet amount <100,000 and/or a creatinine amount >1.1 (or doubling of creatinine in the absence of other renal diseases);
  perinatal death: intrauterine fetal death (i.e., fetal death after 20 weeks of gestation) or neonatal death (i.e., death of a living infant after the first 28 days of life);
  hospitalization in neonatal intensive care unit (NICU), and
  birth weight of infants.

The below Table 2 shows the aforementioned parameters and the respective results found in the group of women treated with VEA® Oris and in the control group, calculating the statistical significance of the results found (p value).

TABLE 2

Results of the treatment with VEA ® Oris on preterm births and associated conditions, in the group of women treated with VEA ® Oris compared to the control group.

|  | VEA ® Oris Oral Spray N = 100 | Control N = 100 | P value |
|---|---|---|---|
| Preterm births at less than 37 weeks | 15 (15%) | 27 (27%) | 0.04* |
| Preeclampsia | 5 (5%) | 6 (6%) | NS |
| Prenatal death | 0 | 0 | — |
| Birth weight (grams) Average ± SD | 3.105 ± 748 | 2.945 ± 860 | Average difference 160 grams |
| Hospitalization in neonatal intensive care unit (NICU) | 6 (6%) | 8 (8%) | NS |

Data are shown as numbers (percentages) or as average ± standard deviation (SD).
NS: non-significant;
*statistically significant data.

The results reported in Table 2 show that women treated with VEA® Oris oral spray showed a significant reduction of preterm births compared to the control group and gave birth to infants having a higher weight compared to that of the control group.

Moreover, the use of the product VEA® Oris was confirmed to be safe for pregnant women and infants, since no prenatal deaths were recorded.

In addition, VEA® Oris contributed to reduce the percentage of preeclampsia, a condition that often occurs during pregnancy.

BIBLIOGRAPHY

1. Depa A R, Gundabattula S R. Recurrence risk of preterm births: a retrospective Indian study [published online ahead of print, 2019 Dec. 3]. J Obstet Gynaecol. 2019; 1-4. doi:10.1080/01443615.2019.1673712
2. Matei A, Saccone G, Vogel J P, Armson A B. Primary and secondary prevention of preterm birth: a review of systematic reviews and ongoing randomized controlled trials. Eur J Obstet Gynecol Reprod Biol. 2019; 236: 224-239. doi:10.1016/j.ejogrb.2018.12.022
3. Romero R, Nicolaides K H, Conde-Agudelo A et al. Vaginal progesterone decreases preterm birth ≤34 weeks of gestation in women with a singleton pregnancy and a short cervix: an updated meta-analysis including data from the OPTIMUM study. Ultrasound Obstet Gynecol, 2016; 48:308-17
4. Berghella V, Rafael T J, Szychowski J M, Rust O A, Owen J. Cerclage for short cervix on ultrasonography in women with singleton gestations and previous preterm birth: a meta-analysis. Obstet Gynecol, 2011; 117:663-71
5. Berghella V, Odibo A O, To M S, Rust O A, Althuisius S M. Cerclage for short cervix on ultrasonography: meta-analysis of trials using individual patient-level data. Obstet Gynecol, 2005; 106:181-9
6. Arabin B, Halbesma J R, Vork F, Hubener M, van Eyck J. Is treatment with vaginal pessaries an option in patients with sonographically detected short cervix? J Perinat Med, 2003; 31:122-3
7. Vitsky M. Simple treatment of the incompetent cervical os. Am J Obstet Gynecol, 1961; 81:1194-7
8. Jones G, Clark T, Bewley S. The weak cervix: failing to keep the baby in or infection out? Br J Obstet Gynaecol, 1998; 105:1214-5
9. Society for Maternal-Fetal Medicine Publications Committee, with assistance of Vincenzo Berghella. Progesterone and preterm birth prevention: translating clinical trials data into clinical practice. Am J Obstet Gynecol, 2012; 206:376-86
10. Lumley J, Chamberlain C, Dowswell T et al. Interventions for promoting smoking cessation during pregnancy. Cochrane Database Syst Rev, 2009; CD001055
11. Ota E, Hori H, Mori R, Tobe-Gai R, Farrar D. Antenatal dietary education and supplementation to increase energy and protein intake. Cochrane Database Syst Rev, 2015; CD000032
12. Saccone G, Saccone I, Berghella V. Omega-3 long-chain polyunsaturated fatty acids and fish oil supplementation during pregnancy: which evidence? J Matern Fetal Neonatal Med. 2016; 29(15):2389-97. doi: 10.3109/14767058.2015.1086742
13. Saccone G, Berghella V, Maruotti G M, Sarno L, Martinelli P. Omega-3 supplementation during pregnancy to prevent recurrent intrauterine growth restriction: a systematic review and meta-analysis of randomized controlled trials. Ultrasound Obstet Gynecol, 2015; 46:659-64
14. Saccone G, Berghella V. Omega-3 supplementation to prevent recurrent preterm birth: a systematic review and metaanalysis of randomized controlled trials. Am J Obstet Gynecol. 2015 August; 213(2):135-40. doi: 10.1016/j.ajog.2015.03.013
15. Saccone G, Berghella V. Omega-3 long chain polyunsaturated fatty acids to prevent preterm birth: a systematic review and meta-analysis. Obstet Gynecol, 2015; 125:663-72
16. Saccone G, Berghella V. Folic acid supplementation in pregnancy to prevent preterm birth: a systematic review and meta-analysis of randomized controlled trials. Eur J Obstet Gynecol Reprod Biol. 2016 April; 199:76-81. doi: 10.1016/j.ejogrb.2016.01.042
17. Karbasian N, Sheikh M, Pirjani R, Hazrati S, Tara F, Hantoushzadeh S4. Combined treatment with cervical pessary and vaginal progesterone for the prevention of preterm birth: A randomized clinical trial. J Obstet Gynaecol Res. 2016 Oct. 8. doi: 10.1111/jog.13138. [Epub ahead of print]
18. Saccone G, Rust O, Althuisius S, Roman A, Berghella V. Cerclage for short cervix in twin pregnancies: systematic review and meta-analysis of randomized trials using individual patient-level data. Acta Obstet Gynecol Scand, 2015; 94:352-8
19. Saccone G, Maruotti G M, Giudicepietro A, Martinelli P; Italian Preterm Birth Prevention (IPP) Working Group. Effect of Cervical Pessary on Spontaneous Preterm Birth in Women With Singleton Pregnancies and Short Cervical Length: A Randomized Clinical Trial. JAMA. 2017 Dec. 19; 318(23):2317-2324. doi: 10.1001/jama.2017.18956. Erratum in: JAMA. 2018 May 1; 319(17):1824. PMID: 29260226; PMCID: PMC5820698.
20. Mastantuoni E, Saccone G, Gragnano E, Di Spiezio Sardo A, Zullo F, Locci M; Italian Preterm Birth Prevention Working Group. Cervical pessary in singleton gestations with arrested preterm labor: a randomized clinical trial. Am J Obstet Gynecol M F M. 2021 March; 3(2):100307. doi: 10.1016/j.ajogmf.2021.100307. Epub 2021 Jan. 7. PMID: 33422659.
21. Nicolaides K H, Syngelaki A, Poon L C, Picciarelli G, Tul N, Zamprakou A, Skyfta E, Parra-Cordero M, Palma-Dias R, Rodriguez Calvo J. A randomized trial of a cervical pessary to prevent preterm singleton birth. New Engl J Med, 2016; 374:1044-52
22. Saccone G, Ciardulli A, Xodo S, Dugoff L, Ludmir J, Pagani G, Visentin S, Gizzo S, Volpe N, Maruotti G M, Rizzo G, Martinelli P, Berghella V. Cervical pessary for preventing preterm birth in singleton pregnancies with short cervical length: a systematic review and meta-analysis. J Ultrasound Med, 2017; 36(8):1535-1543
23. Saccone G, Ciardulli A, Xodo S, Dugoff L, Ludmir J, D'Antonio F, Boito S, Olearo E, Votino C, Maruotti G M, Rizzo G, Martinelli P, Berghella V. Cervical pessary for preventing preterm birth in twin pregnancies with short cervical length: a systematic review and meta-analysis. J Matern Fetal Neonatal Med. 2017 December; 30(24):2918-2925. doi: 10.1080/14767058.2016.1268595. Epub 2017 Jan. 12. PMID: 27915496.
24. Hassan S S, Romero R, Vidyadhari D et al. Vaginal progesterone reduces the rate of preterm birth in women with a sonographic short cervix: a multicenter, randomized, double-blind, placebo controlled trial. Ultrasound Obstet Gynecol, 2011; 38:18-31
25. Romero R, Dey S K, Fisher S J. Preterm labor: one syndrome, many causes. Science. 2014 Aug. 15; 345 (6198):760-5. doi: 10.1126/science.1251816. Epub 2014 Aug. 14. PMID: 25124429; PMCID: PMC4191866.
26. Romero R, Gómez R, Chaiworapongsa T, Conoscenti G, Kim J C, Kim Y M. The role of infection in preterm labour and delivery. Paediatr Perinat Epidemiol. 2001 July; 15 Suppl 2:41-56. doi: 10.1046/j.1365-3016.2001.00007.x. PMID: 11520399.
27. Hope C K, Wang Q, Burnside G, Adeyemi A A, Quenby S, Smith P W, Higham S M, Whitworth M. Assessing the association between oral hygiene and preterm birth by quantitative light-induced fluorescence. ScientificWorldJournal. 2014 Jan. 5; 2014: 374694. doi: 10.1155/2014/374694. PMID: 24511282; PMCID: PMC3913385.
28. Saini R, Saini S, Saini S R. Periodontitis: A risk for delivery of premature labor and low birth weight infants. J Nat Sci Biol Med. 2011 January; 2(1):50-2. doi: 10.4103/0976-9668.82321. PMID: 22470234; PMCID: PMC3312699.

29. Muglia L J, Katz M. The enigma of spontaneous preterm birth. N Engl J Med. 2010 Feb. 11; 362(6): 529-35. doi: 10.1056/NEJMra0904308. PMID: 20147718.
30. Ren H, Du M. Role of Maternal Periodontitis in Preterm Birth. Front Immunol. 2017 Feb. 13; 8:139. doi: 10.3389/fimmu.2017.00139. PMID: 28243243; PMCID: PMC5303728.
31. Grigoriadou M E, Koutayas S O, Madianos P N, Strub J R. Interleukin-1 as a genetic marker for periodontitis: review of the literature. Quintessence Int. 2010 June; 41(6):517-25. PMID: 20490394.
32. Pandey M, Chauhan M, Awasthi S. Interplay of cytokines in preterm birth. Indian J Med Res. 2017 September; 146(3):316-327. doi: 10.4103/ijmr.IJMR_1624_14. PMID: 29355137; PMCID: PMC5793465.
33. da Silva HEC, Stefani C M, de Santos Melo N, de Almeida de Lima A, Rösing C K, Porporatti A L, Canto G L. Effect of intra-pregnancy nonsurgical periodontal therapy on inflammatory biomarkers and adverse pregnancy outcomes: a systematic review with meta-analysis. Syst Rev. 2017 Oct. 10; 6(1):197. doi: 10.1186/s13643-017-0587-3. PMID: 29017560; PMCID: PMC5635531.
34. Bujold E, Morency A R, Chanad F. Effects of periodontal therapy on rate of preterm delivery: a randomized controlled trial. Obstet Gynecol. 2010 February; 115 (2 Pt 1):386. doi: 10.1097/AOG.0b013e3181cdb2d1. PMID: 20093918.
35. Ressler-Maerlender J, Krishna R, Robison V. Oral health during pregnancy: current research. J Womens Health (Larchmt). 2005 December; 14(10):880-2. doi: 10.1089/jwh.2005.14.880. PMID: 16372888.
36. Kakudate N, Morita M, Kawanami M. Oral health care-specific self-efficacy assessment predicts patient completion of periodontal treatment: a pilot cohort study. J Periodontol. 2008 June; 79(6):1041-7. doi: 10.1902/jop.2008.070552. PMID: 18533781.
37. Zhang J, Ab Malik N, McGrath C, Lam O. The effect of antiseptic oral sprays on dental plaque and gingival inflammation: A systematic review and meta-analysis. Int J Dent Hyg. 2019 February; 17(1):16-26. doi: 10.1111/idh.12331. Epub 2018 Feb. 6. PMID: 29405627.
38. Richards D. Limited evidence for the effectiveness of antiseptic sprays for control of plaque and gingival inflammation. Evid Based Dent. 2018 October; 19(3): 75. doi: 10.1038/sj.ebd.6401322. PMID: 30361665.
39. Han Y W. Oral health and adverse pregnancy outcomes—what's next? J Dent Res. 2011 March; 90(3): 289-93. doi: 10.1177/0022034510381905. Epub 2010 Nov. 1. PMID: 21041548; PMCID: PMC3144105.
40. Singh U, Devaraj S, Jialal I. Vitamin E, oxidative stress, and inflammation. Annu Rev Nutr. 2005; 25:151-74. doi: 10.1146/annurev.nutr.24.012003.132446. PMID: 16011463.
41. Lewis E D, Meydani S N, Wu D. Regulatory role of vitamin E in the immune system and inflammation. IUBMB Life. 2019 April; 71(4):487-494. doi: 10.1002/iub.1976. Epub 2018 Nov. 30. PMID: 30501009; PMCID: PMC7011499.

The invention claimed is:

1. A method of reducing a risk of preterm birth and low birth weight of an infant, said method comprising
topically applying to the oral cavity of a pregnant woman a composition in spray form thereby reducing the risk of preterm birth and low birth weight of an infant, said composition consisting of
an ester of vitamin E with a carboxylic acid of formula R—COOH, in which R is an alkyl radical having 1 to 19 carbon atoms, or an alkenyl or alkynyl radical having 2 to 19 carbon; and
an oily vehicle, wherein said oily vehicle is caprylic/capric glyceride.

2. The method of claim 1, wherein said ester of vitamin E is present in said composition in amounts of from 3% to 40% by weight of the total weight of the composition.

3. The method of claim 2, wherein said ester of vitamin E is present in said composition in amounts of from 10% to 30%, by weight of the total weight of the composition.

4. The method of claim 1, wherein said ester of vitamin E is acetate, n-propionate or linoleate.

5. The method of claim 4, wherein said ester of vitamin E is alpha-tocopheryl acetate.

6. The method of claim 1, wherein said composition consists of alpha-tocopheryl acetate and caprylic/capric glyceride.

7. The method of claim 6, wherein said composition consists of 10-30% of alpha-tocopheryl acetate and 70-90% of caprylic/capric glyceride.

* * * * *